United States Patent
Razaznejad et al.

(10) Patent No.: US 8,936,532 B2
(45) Date of Patent: Jan. 20, 2015

(54) METHOD FOR OPERATING A MULTI-CLUTCH TRANSMISSION

(75) Inventors: Behrooz Razaznejad, Göteborg (SE); Anders Eriksson, Torslanda (SE); Johan Bjernetun, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 412 days.

(21) Appl. No.: 13/517,309

(22) PCT Filed: Dec. 21, 2009

(86) PCT No.: PCT/EP2009/009168
§ 371 (c)(1),
(2), (4) Date: Nov. 30, 2012

(87) PCT Pub. No.: WO2011/076225
PCT Pub. Date: Jun. 30, 2011

(65) Prior Publication Data
US 2013/0172147 A1    Jul. 4, 2013

(51) Int. Cl.
*B60W 10/02* (2006.01)
*B60W 10/11* (2012.01)
*F16H 61/02* (2006.01)
(Continued)

(52) U.S. Cl.
CPC .......... *B60W 10/11* (2013.01); *F16H 61/0213* (2013.01); *B60W 10/02* (2013.01); *B60W 10/06* (2013.01); *F16H 61/10* (2013.01); *F16H 2061/0444* (2013.01); *F16H 2306/14* (2013.01); *F16H 2061/161* (2013.01)
USPC .................. 477/175; 477/80; 477/84; 701/55; 701/66

(58) Field of Classification Search
USPC .......................... 477/80, 84, 175; 701/55, 66
See application file for complete search history.

(56) References Cited

U.S. PATENT DOCUMENTS

| | | | |
|---|---|---|---|
| 4,947,331 A | | 8/1990 | Speranza |
| 5,094,213 A | * | 3/1992 | Dudek et al. .................. 477/121 |

(Continued)

FOREIGN PATENT DOCUMENTS

| | | |
|---|---|---|
| DE | 102005028551 A1 | 1/2007 |
| EP | 0352551 A2 | 1/1990 |
| EP | 1152172 A2 | 11/2001 |

OTHER PUBLICATIONS

Chinese Official Action (Apr. 3, 2014) for corresponding Chinese App. 200980163109.4.

(Continued)

*Primary Examiner* — Derek D Knight
(74) *Attorney, Agent, or Firm* — WRB-IP LLP

(57) ABSTRACT

A method and device for operating a dual clutch transmission connectable to an internal combustion engine provided in a vehicle includes providing a control unit for managing at least the internal combustion engine and the transmission, providing a prediction model including at least one simulated shift sequence for the transmission, predicting the time between a first power upshift/downshift and a second power upshift/downshift for the transmission by using the at least one prediction model, modifying at least one parameter for operating the transmission if the predicted time between the first power upshift/downshift and the second power upshift/downshift for the transmission is shorter than a predetermined time.

12 Claims, 4 Drawing Sheets

(51) Int. Cl.
*B60W 10/06* (2006.01)
*F16H 61/10* (2006.01)
*F16H 61/04* (2006.01)
*F16H 61/16* (2006.01)

(56) References Cited

U.S. PATENT DOCUMENTS

| | | | |
|---|---|---|---|
| 5,121,820 A * | 6/1992 | Brown et al. | 192/3.3 |
| 5,479,345 A | 12/1995 | Amsallen | |
| 5,730,682 A | 3/1998 | Depping et al. | |
| 2004/0107034 A1 * | 6/2004 | Togai et al. | 701/54 |
| 2005/0255964 A1 * | 11/2005 | Heap et al. | 477/3 |
| 2008/0125946 A1 | 5/2008 | Fakler et al. | |
| 2009/0203481 A1 | 8/2009 | Nohara et al. | |
| 2009/0210122 A1 | 8/2009 | Tao et al. | |

OTHER PUBLICATIONS

International Search Report (Jun. 23, 2010) for corresponding International application No. PCT/EP2009/009168.

International Preliminary Report on Patentability (Mar. 21, 2012) for corresponding International application No. PCT/EP2009/009168.

* cited by examiner (prior art) Fig. 1

METHOD FOR OPERATING A MULTI-CLUTCH TRANSMISSION

BACKGROUND AND SUMMARY

The invention relates to a method and transmission control system for operating a multi-clutch transmission.

The present invention also relates to a transmission control system, computer program product and a storage medium for a computer all to be used with a computer for executing said method.

Automatic and semi-automatic mechanical transmission systems for vehicles are well known in the prior art. Typically, such systems comprise a multi-speed mechanical change gear transmission, at least one friction clutch drivingly interposed the engine and the transmission and a central processing unit or controller for receiving input signals from sensors and issuing command output signals to actuators for operating the transmission.

An automatic/semiautomatic transmission skip shift, i.e., a direct shift of more than one ration step, is also known in the prior art e.g. U.S. Pat. No. 4,576,065.

In a multi-clutch transmission such as dual clutch transmission (DCT), power-shifting may be preferred in most situations.

In certain vehicular operating conditions with a vehicle equipped with a DCT, the vehicle operator may command a skip shift from the previously engaged gear ratio to a desirably engaged ratio. Typically, skip up-shifts are demanded in those situations wherein the vehicle is relatively lightly loaded, travelling on a flat ground or downhill and when powerful vehicle acceleration is performed. This is due to the fact that in such conditions, the engine speed after a power-up-shift can be higher than or near the up-shift speed, leading to a short time between successive upshifts and an increase in number of gear shifts. The skip shifts are used in order to avoid a series of rapid single up-shifts by shifting directly into a desirable lower gear ratio (higher gear). Such skip-shifting strategy may prolong the clutch life and increase the driving comfort.

A corresponding vehicular operating condition can occur when a vehicle is driven in a road condition, such as a steep uphill and heavy vehicle, where the vehicle travel resistance is very high, that is, a DCT would rapidly perform several successive power down-shifts. The same problem with increased clutch wear and decreased driving comfort would be the result.

Skip shifting may be actuated by, for example, pressing a skip shift button by the vehicle operator. Due to other tasks facing the operator of the vehicle, the skip shift button may not be actuated at all or at a wrong time, thereby obviating the benefits of having the skip shift function at all. The problem with the system described above is that it puts the burden on the operator to actuate the skip shift button. DE102005028551 discloses a method for operating a multi-clutch transmission drivingly connectable to a prime mover provided in a vehicle for propulsion.

It is desirable to provide an improved method and device for controlling a multi-clutch transmission without contemporaneous input from the vehicle operator.

In a first aspect of the invention it is provided a method for operating a multi-clutch transmission drivingly connectable to a prime mover provided in a vehicle for propulsion, said method comprising the steps of:

providing a control unit for managing at least the prime mover and the transmission, providing a prediction model comprising at least one simulated shift sequence for said transmission, characterized in that said method further comprising the steps of:

predicting the time between a first power upshift and a second power upshift or a first power downshift and a second power downshift for said transmission by using said at least one prediction model, modifying at least one parameter for operating the transmission if the predicted time between said first power upshift/downshift and said second power upshift/downshift for said transmission is shorter than a predetermined time limit.

The method is characterized in that said parameter for operating said transmission is modified by performing at least one of the following steps:

lowering said first shift speed limit;

increasing said second shift speed limit, and where said shift speed limits are only allowed to be modified to a maximum extent where said prime mower still remains within a maximum torque range for said prime mower.

According to a further embodiment of the invention said method further comprising the step of providing information about engine rpm, vehicle speed, an accelerator position, and road information to said control unit.

In another embodiment of the invention said predetermined time limit is shorter than 1 second.

In a further embodiment of the invention said predicting of the time between a first upshift/downshift and a second upshift/downshift is performed by a real time simulation by said control unit.

In another embodiment of the invention said first power upshift/downshift and said second power upshift/downshift are successive power shifts.

In a further embodiment of the invention said parameter for operating said transmission is a first shift speed limit for said first power upshift/downshift and a second shift speed limit for said second power upshift/downshift.

In a further embodiment of said embodiment a two or more steps of a conventional up-/downshift is selected if said predicted time is longer than said predetermined time even though said shift speed limits have been modified to said maximum extent.

In another embodiment of the invention said parameter for operating said transmission is at least two shift sequences. In a further embodiment of this mentioned embodiment said at least two shift sequences comprise one of:

a sequential power up-shifting and a two or more steps of a conventional upshift, a sequential power down-shifting and a two or more steps of a conventional downshift.

In a still further embodiment said two or more steps of a conventional up-/downshift is selected if said predicted time with said first power upshift and said second power upshift or said first power downshift and said second power downshift is shorter than said predetermined time limit.

There is also provided a transmission control system comprising a control unit arranged for controlling a multi-clutch transmission, characterized in that said control unit is programmed to perform the steps of the first mentioned method embodiment.

The advantage of the invention is better travelling comfort and a decreased clutch wear.

BRIEF DESCRIPTION OF THE DRAWINGS

The present invention together with the above mentioned and other objects and advantages may best be understood from the following detailed description of the embodiments, but not restricted to the embodiments, wherein is shown schematically.

DETAILED DESCRIPTION

Figure 1:
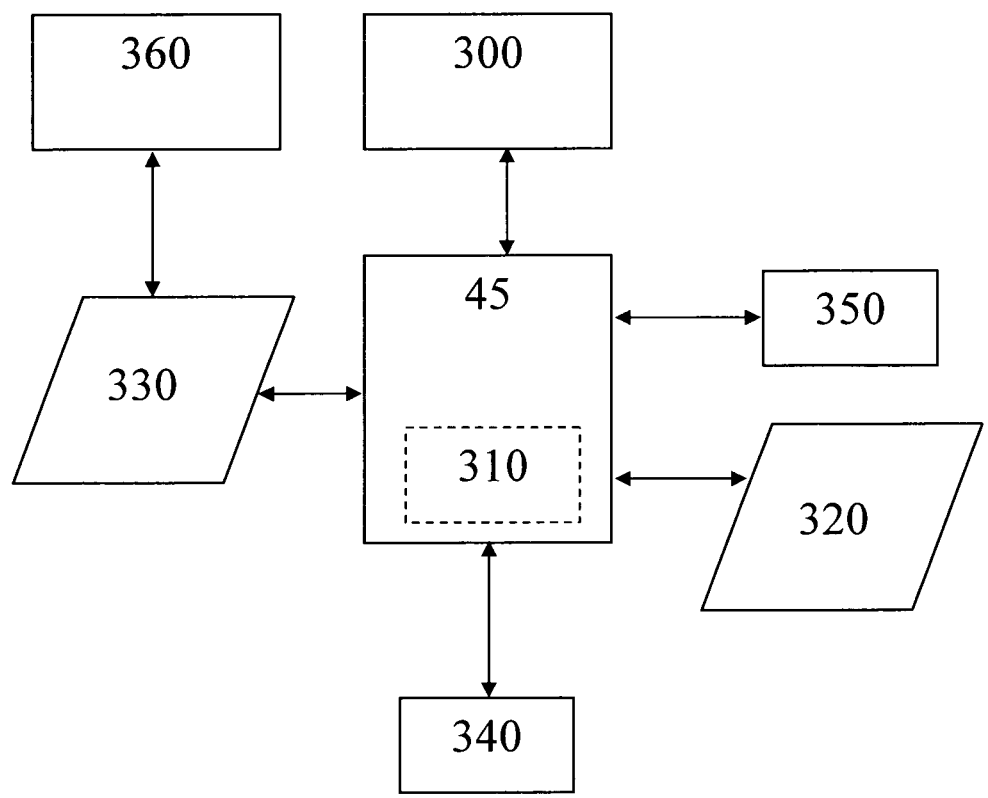
FIG. 1 shows an overview of inputs into the control unit according to known art.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

FIG. 1 illustrates schematically a simulation or prediction model and input, which a control unit 45 needs to be able to generate a computer simulation. Said prediction model can be implemented in a vehicle comprising a prime mower (for example an engine) drivingly connected to a multi-clutch transmission (such as a DCT) controlled by said control unit 45, and where an output shaft from said DCT can be drivingly connected to driven wheels of said vehicle. With one control 300 for manual or automatic control parameter weighting, providing a driving criterion selected by the driver, the simulation can be controlled. The driver can select to prioritize, for example, low fuel consumption (for economical driving, for example) constant vehicle speed (for rapid driving at high average speed, for example), a certain level of emissions (for environmentally friendly driving) or a combination (weighting) of said control parameters. For automatic control parameter weighting, a model stored in said control unit is used, which takes into consideration various parameters, such as throttle opening position and the mass of the vehicle. The weighting of the control parameters, is different for different gear speeds.

For example, low fuel consumption has high priority for high gears, and a heavy vehicle driving uphill has a high weighting for average speed. The switch 300 is adapted for communication with the control unit 45. Pedal mappings 310, i.e. engine torque as a function of rpm for various throttle opening positions, are stored in the control unit 45. An electronic map 320, for example stored on a CD-ROM (Compact Disc Read Only Memory) contains the information on a region's topology necessary for the computer simulation, i.e. at least gradients or elevation values for the route, with sea level as a reference, for example, and any information concerning speed limits along the route. The computer simulation uses parameters 330 sent from meters and sensors 360, in accordance with known technology. These comprise or consist at least of vehicle or train weight, instantaneous vehicle speed, gear ratios, degrees of efficiency, engine rpm, throttle opening position (even throttle opening position change), instantaneous position, road incline (not from electronic map), ambient temperature (which affects the fuel/air mixture), driving resistance and the engine dynamics of the engine. Driving resistance refers to a value computed by the control unit in response to signals indicating instantaneous engine torque and instantaneous vehicle acceleration and mass, constituting an indication of road incline, any tailwind or headwind and the rolling resistance of the vehicle. Furthermore, consideration can also be taken to information on the speed of the preceding vehicle. In the control unit 45, there are engine models including steady state torque, which is the torque, the engine can deliver steadily at a given operational point, i.e. where so-called transients to get to the operational point have been left out. With the necessary information, the control unit 45 can compute (simulate over a certain, predetermined time) i.a. fuel consumption, average speed and emissions (both exhaust and noise emissions), for a set of different gears included in different shifting schedules by solving equations with simulations and time increments. The best shifting schedule is selected by comparing computed fuel consumption, average speed and emissions or combinations of these, on the basis of a criterion selected by the driver, with matrices stored in the control unit 45. Furthermore, FIG. 1 shows a symbol for GPS 350, which communicates with said control unit, possibly also through the sensors 360. As an output from the control unit 45, there is sent a decision 340, i.e. a gear selection according to the selected shifting schedule.

As an alternative to GPS and electronic maps for example route identification can be used.

Figure 2:
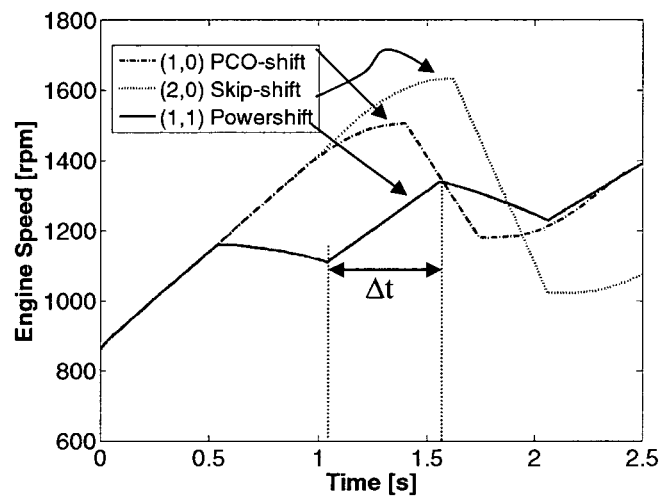
FIGS. 2, 3 and 5 show schematically diagrams over engine speed as a function of time for different simulated gear shift sequences and the different embodiments of the invention are explained through these figures.
Figure 3:
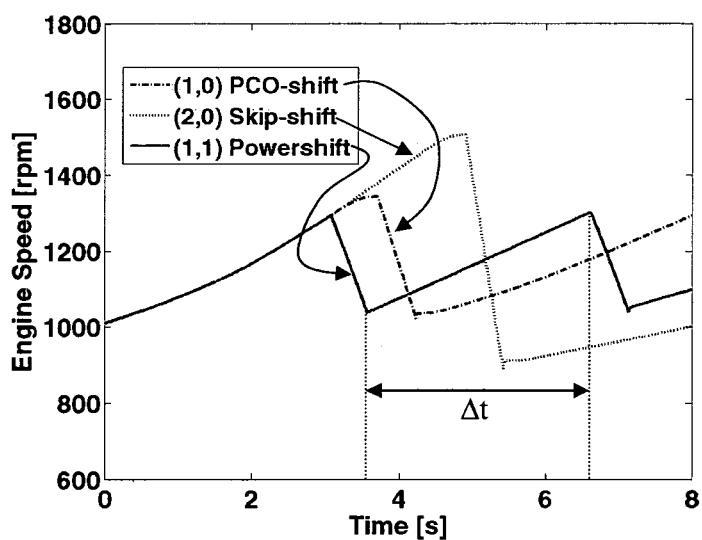
Figure 5:
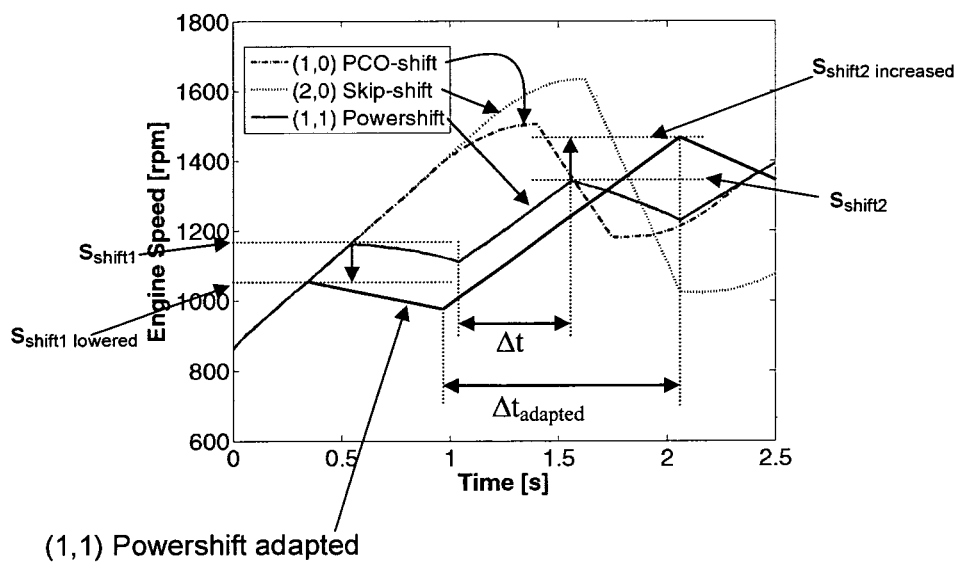

Based on a simulation or prediction model, such as for example the above mentioned, embodiments according to the invention will now be explained. In the shown embodiments for upshifting three different up-shift sequences can be simulated. These include:

(i) a 1+1-step power-shift sequence, where two successive power-up-shifts are predicted. In FIGS. 2, 3 and 5 this is depicted "(1,1) Power-shift" where the first figure in the parenthesis represents the first gear shift and the second figure represents the next coming gear shift, (ii) a 1-step conventional power cut-off up-shift sequence ((1,0) PCO-shift in FIGS. 2, 3 and 5), which is mainly used for the gear shifting over a range (DCT equipped with for example a planetary range gear), where a power-shift is not possible when a range gear is shifted, and (iii) a 2-step conventional power cut-off up-shift sequence ((2,0) Skip-shift in FIGS. 2, 3 and 5), which can be used for avoiding power-shifting in light driving conditions and powerful vehicle acceleration.

Having obtained the above-mentioned different gear shift predictions, several interesting parameters can be estimated. According to the invention the most important parameter in the skip-shift strategy is the estimated time (Δt in figures) between two successive power-shifts, which is obtained from the (1,1) power-shift sequence. If the estimated time is lower than a predefined time limit (typically 1 s), which indicates light driving conditions, the control unit 45 can be programmed to avoid a power shift with successive gears. Instead a 2-step conventional up-shift, i.e. a skip-shift, is selected, provided that this sequence is an accepted gear shift sequence. The latter is fulfilled if it is predicted that the engine speed after the shift will be higher than a predefined engine speed limit, a good acceleration is obtained after the shift, and the time to the next conventional gear shift is sufficiently high.

In order to elucidate the skip-shift strategy according to the invention further, the result for two different prediction exemplified scenarios has been plotted and illustrated in FIGS. 2 and 3. In both cases full throttle and a flat ground have been considered. In the examples a 12-speed DCT is used (the DCT comprises a 6-speed basic gearbox and a range gearbox, which gives 6×2 gears). Other configurations of multi-clutch transmissions are possible to be used with the invention.

In the first (FIG. 2) exemplified vehicle condition the engaged gear is gear 3, i.e. low range where a rather high torque is transmitted through the drivetrain. As can be seen the estimated time At between two successive power-up-shifts is approximately 0.6 s, which is lower than said predetermined time limit of for example 1 s. Furthermore, based on several conditions mentioned above, the 2-step conventional power cut-off shift is an accepted shift sequence. Hence, as a result from the prediction instead of a power-shift said control unit 45 is according to one embodiment of the invention programmed to perform a 2-step conventional shift ((2,0) Skip-shift) since the predicted At is registered to be below said predetermined time limit.

In the second (FIG. 3) vehicle condition the engaged gear is gear 8, i.e high range where the transmitted torque through the drivetrain is not very high. In this case the estimated time At between two successive power-shift is approximately 3 s, which is higher than said predetermined time limit. Although the 2-step conventional power cut-off gear shift ((2,0) Skip-shift) is an accepted gear shift the control unit is according to the invention programmed to perform a power-shift ((1,1) Powershift).

In a further embodiment of the invention the above mentioned prediction or simulation can also be performed by using only two of the three mentioned shifting sequences, that is, said ((1,1) Power-shift and (2,0) skip-shift. Thus, the step where the time At between two successive power-up-shifts is estimated is the same as in the previous embodiment.

According to a further embodiment of the invention a corresponding prediction can be used for down-shifts. For example if a heavily loaded vehicle is driven in a steep uphill a vehicle condition can occur where the DCT has to make several fast downshifts in order to adapt gear ratio to the swiftly decreasing vehicle speed. If a prediction gives that the estimated time At between two successive powershifts ((−1,−1) Powershift not shown) is below a predetermined time limit, of for example 1 second, said control unit 45 can be programmed to perform a conventional 2-step downshift (if accepted). Also here a better traveling comfort and a decrease of clutch wear is achieved.

Figure 4:
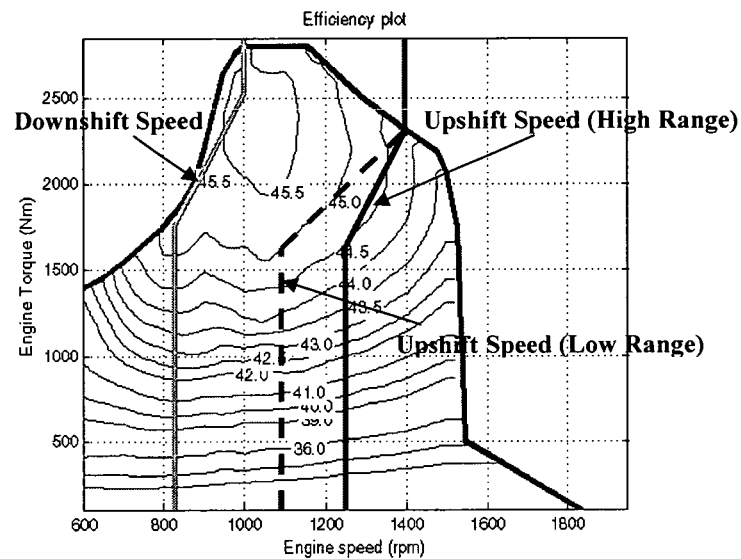
FIG. 4 shows schematically a diagram over engine torque as a function of engine speed and maximum torque range for an engine.

In a further embodiment of the invention and based on the estimated time At between two successive power-up-shifts, an adaptive skip-shift strategy could be implemented. Briefly, according to this embodiment of the invention, the shift-speeds are changed in such a way that an acceptable time between shifts is reached. This can be done by said control unit 45 being programmed to perform simulations. Obviously, the shift-speeds should remain within the maximum engine torque range in order to avoid loosing power. FIG. 4 illustrates an example of a maximum engine torque range for a narrow-band engine. As can be seen in FIG. 4 the engine rpm and the engine torque has to be basically within the marked Downshift Speed and Upshift Speed (High and Low range respectively) area.

In order to fully explain the adaptive skip-shift strategy, a shifting case as disclosed in FIG. 5 where the time At between two successive power-up-shifts is short is considered. First, the shift speed (sshiftis) for the first gear up-shift could be lowered to Sshifti lowered—This is due to the fact that the engine is accelerating during a power-shift, as there is no torque interrupt. Second the up-shift speed (sShift2) for the second power-shift could be raised successively until an acceptable time (Atadapted) between two successive power-up-shifts is reached. An acceptable time occurs when the up-shift speed has been increased to sShift2 increased— Thus, said control unit is programmed to perform the mentioned predictions and select the shift speeds where an acceptable time between two successive power-up-shifts can be reached. However, if the control unit predicts that the up-shift speed is raised above the maximum performance speed, given by the maximum engine torque curve (see for example FIG. 4), and the time between shifts is still shorter than a predetermined time limit (typically 1 s), the control unit 45 is then programmed to perform a 2-step conventional gear shift, i.e. a skip-shift. The advantage with this embodiment where the time between two successive power-up-shifts is increased is mainly increased travelling comfort.

In the embodiment described trough FIGS. 4 and 5 mentioned prediction or simulation can also be preformed by using only two of the three mentioned shifting sequences, that is, said (1,1) Power-shift and (2,0) skip-shift.

Also in the embodiment described in FIGS. 4 and 5 a corresponding way of prediction for down-shift can be preformed. Thus, here the first down-shift-speed is performed earlier, that is, the shift speed is increased, and the second down-shift-speed can be performed later, that is, the shift speed is decreased.

In a further embodiment of the invention said control unit 45 can be programmed to first try with the strategy according to the above described FIG. 5, and if it is not possible to adapt said time At between two successive power-up-shifts then said control unit 45 can be programmed to predict and control according to the embodiment described through FIGS. 2 and 3.

In the shown exemplified embodiments only a 2-step conventional power cut-off up-shift ((2,0) Skip-shift) is disclosed. In further embodiments also other skip-shifts can be simulated or predicted, for example, 3-step skip-shift, 4-step skip-shift or more.

Figure 6:
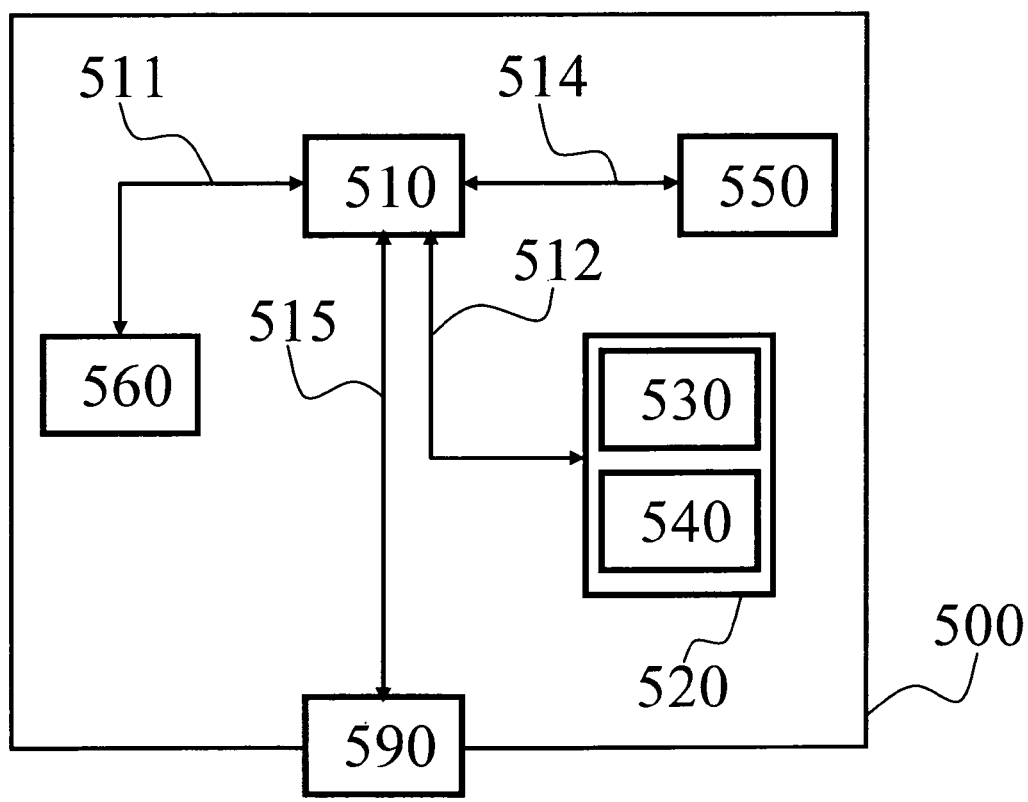
FIG. 6 shows the invention applied on a computer arrangement.

FIG. 6 shows an apparatus 500 according to one embodiment of the invention, comprising a nonvolatile memory 520, a processor 510 and a read and write memory 560. The memory 520 has a first memory part 530, in which a computer program for controlling the apparatus 500 is stored. The computer program in the memory part 530 for controlling the apparatus 500 can be an operating system.

The apparatus 500 can be enclosed in, for example, a control unit, such as the control unit 45. The data-processing unit 510 can comprise, for example, a microcomputer.

The memory 520 also has a second memory part 540, in which a program for controlling the target gear selection function according to the invention is stored. In an alternative embodiment, the program for controlling the multi-clutch transmission is stored in a separate nonvolatile data storage medium 550, such as, for example, a CD or an exchangeable semiconductor memory. The program can be stored in an executable form or in a compressed state.

When it is stated below that the data-processing unit 510 runs a specific function, it should be clear that the data-processing unit 510 is running a specific part of the program stored in the memory 540 or a specific part of the program stored in the nonvolatile recording medium 550.

The data-processing unit 510 is tailored for communication with the memory 550 through a data bus 514. The data-processing unit 510 is also tailored for communication with the memory 520 through a data bus 512. In addition, the data-processing unit 510 is tailored for communication with the memory 560 through a data bus 511. The data-processing unit 510 is also tailored for communication with a data port 590 by the use of a data bus 515.

The method according to the present invention can be executed by the data-processing unit 510, by the data-processing unit 510 running the program stored in the memory 540 or the program stored in the nonvolatile recording medium 550.

The invention should not be deemed to be limited to the embodiments described above, but rather a number of further variants and modifications are conceivable within the scope of the following patent claims.

The invention claimed is:

1. A method for operating a multi-clutch transmission drivingly connectable to a prime mover provided in a vehicle for propulsion, the method comprising:
   providing a control unit for managing at least the prime mover and the transmission,
   providing a prediction model comprising at least one simulated shift sequence for the transmission,
   predicting a time between a first power upshift and a second power upshift or a first power downshift and a second power downshift for the transmission by using the at least one prediction model,
   modifying at least one parameter for operating the transmission if the predicted time between the first power upshift/downshift and the second power upshift/downshift for the transmission is shorter than a predetermined time limit, wherein the parameter for operating the transmission is a first shift speed limit for the first power upshift/downshift and/or a second shift speed limit for the second power upshift/downshift,
   wherein the parameter for operating the transmission is modified by performing at least one of the following steps:
   lowering the first shift speed limit;
   increasing the second shift speed limit,
   and where the shift speed limits are only allowed to be modified to a maximum extent where the prime mower still remains within a maximum torque range for the prime mower.

2. The method according to claim 1, wherein a two or more steps of a conventional up-/downshift is selected if the predicted time is longer than the predetermined time even though the shift speed limits have been modified to the maximum extent.

3. The method according to claim 1, further comprising the step of providing information about engine rpm, vehicle speed, an accelerator position, and road information to the control unit.

4. The method according to claim 1, wherein the predetermined time limit is shorter than 1 second.

5. The method according to claim 1, wherein the predicting of the time between a first upshift/downshift and a second upshift/downshift is performed by a real time simulation by the control unit.

6. The method according to claim 1, wherein the first power upshift/downshift and the second power upshift/downshift are successive power shifts.

7. The method according to claim 1, wherein the parameter for operating the transmission is at least two shift sequences.

8. The method according to claim 7, wherein the at least two shift sequences comprise one of:
   a sequential power up-shifting and a two or more steps of a conventional upshift,
   a sequential power down-shifting and a two or more steps of a conventional downshift.

9. The method according to claim 8, wherein the two or more steps of a conventional up-/downshift is selected if the predicted time with the first power upshift and the second power upshift or the first power downshift and the second power downshift is shorter than the predetermined time limit.

10. A transmission control system comprising a control unit arranged for controlling a multi-clutch transmission wherein the control unit is programmed to perform the steps of claim 1.

11. A computer program product comprising a non-transitory computer readable medium for performing all steps of the claim 1.

12. A non-transitory storage medium for use in a computing environment, the medium comprising a computer readable program code to perform the method of claim 1.

* * * * *